F. J. TONE.
METHOD OF SILICIDIZING ARTICLES CONTAINING CARBON.
APPLICATION FILED NOV. 22, 1912.

1,054,373.

Patented Feb. 25, 1913.

WITNESSES

INVENTOR

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF SILICIDIZING ARTICLES CONTAINING CARBON.

1,054,373.        Specification of Letters Patent.        Patented Feb. 25, 1913.

Original application filed March 26, 1912, Serial No. 686,386. Divided and this application filed November 22, 1912. Serial No. 732,879.

*To all whom it may concern:*

Be it known that I, FRANK J. TONE, a citizen of the United States, residing at Niagara Falls, Niagara county, New York, have invented a new and useful Method of Silicidizing Articles Containing Carbon, of which the following is a full, clear, and exact description, reference being had to the accompanying drawings, forming part of this specification, in which—

Figure 1:
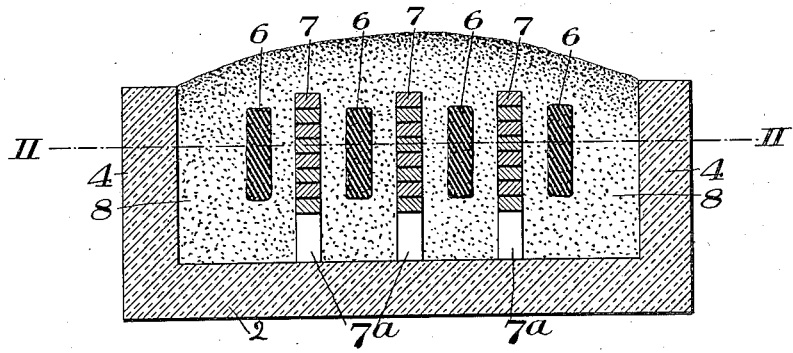
Figure 2:
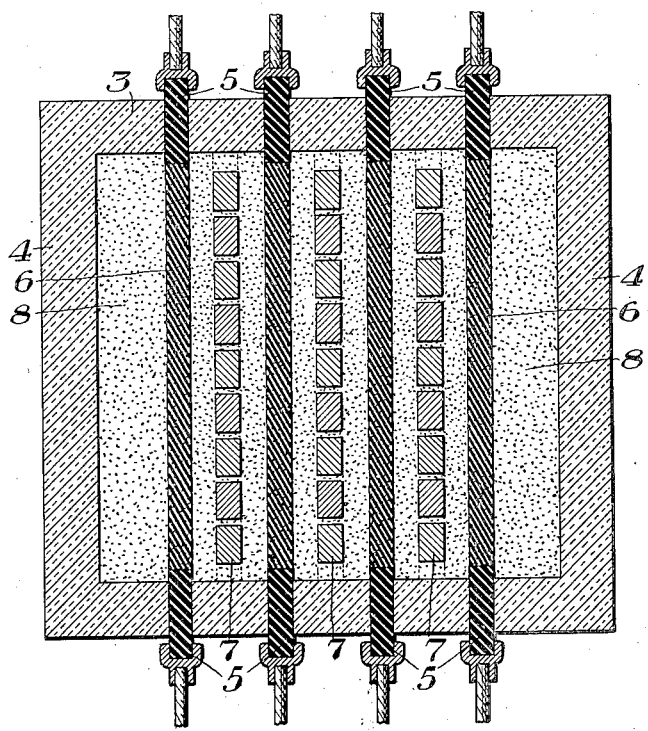

Figure 1 is a vertical cross section showing a preferred form of furnace constructed in accordance with my invention; and Fig. 2 is a horizontal sectional view of the same.

My invention relates to a method of silicidizing articles containing carbon or silicon carbid in a carbon-resistor furnace, and is especially adapted for the conversion of shaped articles into silicon carbid, such for example, as the articles obtained in the process described in United States Letters Patent No. 992,698, issued to me on May 16th, 1911. The present application is a division of my pending application Serial No. 686,386, filed March 26th, 1912.

By the silicidizing of articles containing carbon or silicon carbid, I mean to include the making of all shaped articles of silicon carbid in which the production of the finished article is accomplished by the action of silicon containing vapors. In such processes, molded articles of silicon carbid and carbon are buried in the mixture of silica and carbon and subjected to a temperature sufficient to form silicon-containing vapors, which penetrate the molded articles and convert them into solid articles of substantially pure silicon carbid. In such processes as heretofore practised, the majority of the energy supplied was consumed in converting the enveloping mixture of silica and carbon into silicon carbid, a relatively small amount of the energy being available for the desired work of silicidizing the articles to be treated. In other words, such furnaces have had a very small capacity in proportion to the power used. Furthermore, uniform radiation from the resistance core into the article being treated was not obtained and the articles were subjected to displacement and other difficulties.

My invention is designed to provide a novel method which will better equalize the temperature throughout the conversion or silicidizing zone, and in which more of the power will be consumed in a silicidizing action, giving greater uniformity, greater economy of energy consumption, and more satisfactory operating conditions.

In the drawings, in which I show one form of furnace which may be used in carrying out my invention, 2 represents the base; 3, 3 the head walls; and 4, 4 the side walls of the furnace, which is preferably of box-like form open at the top. The carbon electrode terminals are shown at 5, 5, extending through the head walls and suitably connected to the source of electrical energy.

The resistance cores are shown at 6, these being shaped so that the vertical dimension is much greater than the horizontal dimension, thus giving a more uniform horizontal radiation of heat from the sides of the core into the conversion zones, which are substantially parallel and equidistant from it. These cores are preferably made of granular carbon, though other suitable resistance material may be used, and they may be of block form or other solid shapes, if desired. By reason of elongating the resistor vertically, I am enabled to utilize a much greater proportion of the energy radiated than with a circular core. The amount of energy radiated uselessly upwardly and downwardly is greatly lessened on account of the small amount of surface, as compared with that at the sides of the resistor.

The silicidizing zones are shown at 7, these being charged, for example, with molded articles to be converted, placed upon suitable supports 7ª. These articles are placed in a vertical pile, the sides of which are preferably substantially parallel with and equidistant from the cores. The thickness of the conversion zone is so proportioned that a good conversion will be obtained throughout the zone, this being determined by trial by varying the energy output and the time of treatment. It will, of course, vary with different compositions.

The articles to be treated are preferably provided with separators of carbon or other material, to permit a better permeation of the silicon vapors, and care should be exercised in separating them lengthwise of the core, in order to reduce as far as possible the formation of leakage paths for the current. It is also desirable to form the corresponding breaks in the support, in order to prevent leakage through the base of the furnace.

8 represents the embedding mixture which preferably consists of thirty parts pulverized coke, sixty parts silica sand and seven parts sawdust. This preferably entirely surrounds the core and the articles to be treated, except that the latter may be supported from the base of the furnace. By this arrangement, the articles will better preserve their shape and keep a constant position during treatment, as there is apt to be settling and displacement of the cores.

The proportioning of the cores and the furnace dimensions will preferably follow the practice in the well-known granular-core silicon-carbid furnace, the principles of which are well known.

In using the furnace, it is operated in the same manner as a silicon-carbid furnace, and the run is preferably continued until the mixture between the cores and the silicidizing zone is converted into silicon carbid. The silicidizing effect may be varied within considerable limits. When treating carbon articles and carrying the temperature of the silicidizing zone only up to the point of formation of amorphous silicon carbid, if the time of treatment is properly extended, the carbon articles will be converted into amorphous silicon carbid. When a denser form of silicon carbid is desired, the operatiton is carried to the point where the entire space between the cores is brought above the temperature necessary for the formation of crystalline silicon carbid. After the operation has continued for a sufficient time to give the desired degree of conversion, the furnace is shut down, allowed to cool and then unloaded. The upper and lower tiers of materials may be retreated, if they do not show the desired degree of conversion.

It is important that the surrounding mixture shown at 8 should be sufficiently porous to permit free circulation of silicon-containing vapors, and in place of using sawdust or similar material for such purpose, it is possible to use the silica and carbon in coarser lumps or a mixture thereof in briquet form. I have also found in certain cases that the addition of silicon carbid to the silica carbon mixture will give improved results. In such cases, this reduces the shrinkage and settlement of the mixture, aids in the conduction of heat from the cores to the silicidizing zones, and has certain other advantages.

The advantages of my invention result primarily from the increased efficiency and economy, owing to reducing the amount of useless radiation and increasing the proportion of energy utilized by the elongated substantially parallel arrangement of the cores and silicidizing zones. The resulting articles are also more uniformly converted and of better quality.

Changes may be made in the form and arrangement of the furnace and cores and the articles to be treated, without departing from my invention.

I claim:—

1. The process of silicidizing articles containing carbon in a carbon-resistor furnace, which consists in assembling said articles in self-supported piles broken in the direction of current flow, disposing said piles along the resistor in a position to be heated by the same, surrounding said resistor and articles with a porous mixture capable of generating silicon-containing vapors, and passing sufficient current through said resistor to silicidize said articles.

2. The process of silicidizing articles containing carbon in a carbon-resistor furnace, which consists in assembling said articles in self-supported piles broken in the direction of current flow, disposing said piles along a plurality of resistors in a position to be heated by the same, surrounding said resistors and articles with a porous mixture capable of generating silicon-containing vapors, and passing sufficient current through said resistors to silicidize said articles.

3. The process of silicidizing articles containing carbon in a carbon-resistor furnace, which consists in assembling said articles in self-supported piles broken in the direction of current flow, disposing said piles along the resistor in a position to be heated by the same, said resistor being shaped to give a maximum horizontal radiation and a minimum vertical radiation, surrounding said resistor and articles with a porous mixture capable of generating silicon-containing vapors, and passing sufficient current through said resistor to silicidize said articles.

4. The process of converting shaped articles into silicon carbid in a carbon-resistor furnace, which consists in assembling said articles in self-supported piles broken in the direction of current flow, disposing said piles along the resistor in a position to be heated by the same, surrounding said resistor and articles with a porous mixture capable of generating silicon-containing vapors, and passing sufficient current through said resistor to silicidize said articles.

5. The process of silicidizing articles containing carbon in a carbon-resistor furnace, which consists in assembling said articles in self-supported piles broken in the direction of current flow, disposing said piles along the resistor in a position to be heated by the same, surrounding said resistor and articles with a porous mixture containing silica and carbon, and passing sufficient current through said resistor to silicidize said articles.

In testimony whereof, I have hereunto set my hand.

FRANK J. TONE.

Witnesses:
   A. D. KEPOR,
   GEORGE W. CHORMANN.